Patented Mar. 17, 1936

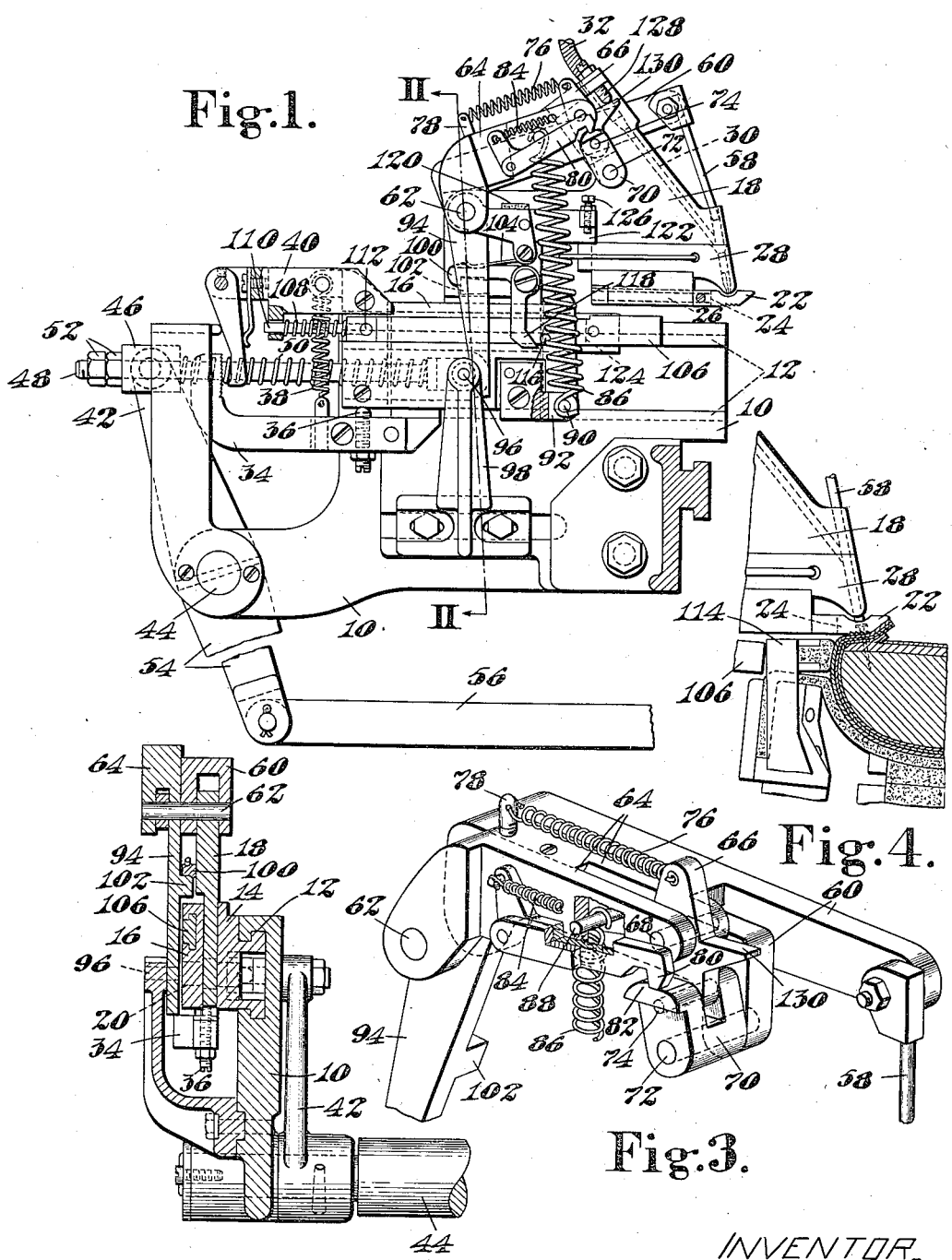

2,034,039

UNITED STATES PATENT OFFICE 2,034,039

FASTENING-INSERTING MECHANISM

Eric A. Holmgren, Lynn, Mass., assignor to United Shoe Machinery Corporation, Paterson, N. J., a corporation of New Jersey Original application May 18, 1933, Serial No. 671,664. Divided and this application April 12, 1934, Serial No. 720,274. Renewed June 25, 1935

14 Claims. (Cl. 1—18)

This invention relates to fastening-inserting mechanism, the present application being a division of my copending application for Letters Patent for improvements in lasting machines, Serial No. 671,664, filed on May 18, 1933. The invention is herein illustrated as applied to fastening-inserting mechanism designed for use as a part of a lasting machine organization of the character disclosed in the copending application for driving tacks to fasten shoe uppers in lasted position, but it is to be understood that the invention is not limited to the illustrated embodiment nor limited to tack-driving means.

The fastening-inserting mechanism herein shown is movable toward and from the work in directions transverse to the direction in which the fastening is driven, and includes a driver which is operated by a spring to drive the fastening only part way into the work. The driver is retracted to its starting position against the resistance of the spring in the course of the movement of the fastening-inserting mechanism away from the work. An object of the present invention is to insure against displacement of the partially driven fastening by the pressure of the driver thereon as the fastening-inserting mechanism starts its movement away from the work. To this and other ends, the invention provides novel means for partially retracting the driver prior to the movement of the mechanism away from the work. For the purpose in view, the construction shown comprises members which are movable in unison to operate the driver to drive the fastening, and automatic means for effecting relative movement of these members to impart to the driver a partial retractive movement at the end of its driving movement. More particularly, as illustrated, these members are connected together by toggle links which are held against relative movement in the driving of the fastening and are released to the action of a spring which serves to flex the toggle and thereby to impart a short retractive movement to the driver at the end of its driving movement. The driver is thus withdrawn from contact with the fastening and accordingly has no tendency to displace it as the fastening-inserting mechanism is thereafter moved outwardly away from the work, in the course of which outward movement of the mechanism the driver is fully retracted to its starting position.

The novel features of the invention, including various novel details of construction and combinations of parts, will now be more particularly described by reference to the accompanying drawing and pointed out in the claims.

In the drawing,

Fig. 1 is a view mainly in front elevation of fastening-inserting mechanism in which the invention is embodied, parts being shown in section;

Fig. 2 is a section on the line II—II of Fig. 1;

Fig. 3 is a perspective view showing in greater detail a portion of the mechanism shown in Fig. 1; and Fig. 4 is a view illustrating the positions of some of the parts at the end of the fastening-inserting operation.

The invention is herein illustrated as embodied in one of two mechanisms designed for use in the machine shown in the above-mentioned copending application for wiping the margin of the shoe upper inwardly over the insole and for driving tacks partially into the shoe to fasten the upper at the opposite sides of the shoe bottom. The mechanism shown is mounted on a bracket 10 which is fast on the frame of the machine, this bracket having therein a horizontal guideway 12 for a slide 14 (Fig. 2) on the front face of which is fastened a plate 16 having therein a recess to receive the lower portion of another plate 18. The plate 18 is pivotally mounted on a stud 20 which is fast in the slide 14, and the recess in the plate 16 is so formed as to permit short swinging movements of the plate 18 about the stud. Supported on the plate 18 is a wiper 22 for wiping the margin of the upper inwardly over the insole as illustrated in Fig. 4, this wiper having a slot 24 extending inwardly from its edge to permit the driving of a tack between its opposite side portions. The wiper 22 is formed on the end of a rod 26 which is mounted for limited turning movement in the plate 18 about an axis extending laterally of the shoe to permit the wiper to adjust itself to the contour of the shoe. Mounted in recesses in the sides of the plate 18 are a pair of spring-pressed tack fingers 28 provided with a pocket into which each tack is fed through a passage 30 in the plate from a flexible tube 32. Fast on the lower portion of the plate 18 is an arm 34 which carries a stop screw 36 arranged to engage the lower face of the plate 16 to limit adjustably turning movement of the plate 18 in a clockwise direction (Fig. 1) about the stud 20. A spring 38 connected at one end to the arm 34 and at the other end to a member 40 fast on the plate 16 tends to turn the plate 18 in that direction. The plate 18 is turned more or less in the opposite direction against the resistance of the spring 38 by the wedging action of the shoe on the wiper 22 when the wiper is carried inwardly over the shoe bottom by movement of the slide 14 toward the shoe along the guideway 12. Such movement is imparted to the slide 14, both to operate the wiper and to position the fastening-inserting mechanism in proper relation to the shoe, by an arm 42 fast on a rock-shaft 44, this arm being connected at its upper end to a sleeve 46 slidingly mounted on a rod 48 the inner end of which is pivotally connected to the slide 14. A spring 50 on the rod serves as means through which the force of the sleeve 46 is transmitted yieldingly to the slide 14, and nuts 52 on the outer end of the rod are engaged by the sleeve to effect the return outward movement of the slide. For operating the arm 42 there is fast on the rock-shaft 44 another arm 54 connected by a link 56 to mechanism not herein shown but fully disclosed in the copending application.

After the wiper 22 has been moved inwardly over the shoe bottom as above described, the tack is driven from the tack pocket in the fingers 28 by a tack driver 58 pivotally supported on the end of a driver-operating arm 60 which is mounted for swinging movement on a pin 62 on the plate 18. The arm 60 is operated by another arm 64 also mounted to swing about the pin 62 and connected to the arm 60 by a toggle. This toggle comprises a link 66 pivotally mounted on a pin 68 in a forked portion of the arm 64, and a link 70 mounted on a pin 72 on the arm 60, the two links being connected together by a pin 74. A spring 76 connected to the link 66 and to a pin 78 on the arm 64 tends to break the toggle for a purpose hereinafter described, but initially the toggle is held in a substantially straightened condition against the force of the spring 76 by a latch 80 pivoted on the side of the arm 64 and arranged to engage a shoulder on a lug 82 on the link 70, as illustrated in Figs. 1 and 3. The latch is held in this operative position by a spring 84. The arm 64, when operated, is thus rendered effective through the straightened toggle to impart downward driver-operating movement to the arm 60.

The arm 64 is impelled in a downward direction to impart driver-operating movement to the arm 60 by a spring 86 connected at its upper end to a pin 88 on the arm 64 and at its lower end to a pin 90 mounted on a member 92 which is fast on the plate 16. For controlling the arm 64 there is integral therewith a downwardly extending arm 94 which, upon outward movement of the slide 14 away from the shoe, is engaged by a pin 96 mounted in a bracket 98 adjustably secured to the bracket 19, the pin acting on the arm 94 to swing the arm 64 upwardly and thus to lift the driver-operating arm 60 and retract the driver 58 through the toggle links. The arm 94 is retained in the position which it thus assumes under the action of the pin 96 by a latch 100 pivotally mounted on the plate 18 and arranged to engage a lug 102 on the arm 94, the latch being held in operative position by a spring 104. The driver 58 is accordingly held in uplifted position as the slide 14 and the parts thereon are moved inwardly toward the shoe. To render the spring 86 effective to operate the driver, the latch 100 is lifted to release the arm 94 when the slide 14 has arrived substantially at the end of its inward movement. For this purpose there is movably mounted in a horizontal guideway in the plate 16 a bar 106 (Figs. 1 and 2) urged inwardly toward the shoe by a spring 108 mounted on a rod 110 which projects from the outer end of the bar through a lug on the member 40, the inward movement of the bar under the influence of the spring being limited by a pin 112 carried by the bar and extending into a slot in the plate 16. As the slide 14 is moved inwardly toward the shoe the bar 106 is carried into engagement with a member 114 (Fig. 4) which is a part of means disclosed in the copending application for conforming the upper to the contour of the last and occupies a position determined by engagement with the side of the shoe. The movement of the bar 106 is thus stopped in a position determined by the shoe. Thereupon, as the slide 14 continues its inward movement, a pin 116 on the bar 106 engages a finger 118 depending from the latch 100 and acts to lift the latch and thus to release the arm 94 to cause the driving of the tack. The tack-driving movement of the arm 64 under the influence of the spring 86 is limited by contact of the arm with a bumper comprising a piece of leather 120 mounted on a member 122 which is hung on the pin 62 and is fastened to the plate 18. The inward movement of the slide 14 is limited by its engagement with a shoulder 124 on the bar 106.

It will be understood that after the tack has been driven the slide 14 and the parts supported thereon are moved outwardly away from the shoe. Since, however, the pin 96 does not become effective on the arm 94 to retract the driver 58 until the slide has moved a substantial distance outwardly from the shoe, the present invention provides means for guarding against any possible displacement of the partially driven tack by the pressure of the driver 58 thereon. For this purpose the previously mentioned toggle 66, 70 is rendered effective to impart a short upward movement to the driver-operating arm 60 immediately after the downward movement of the arm to drive the tack. The latch 80, previously referred to as holding the toggle in a straightened condition against the pull of the spring 76, is carried by the downward movement of the arm 64 into contact with the head of a screw 126 (Fig. 1) threaded in the member 122, so that the latch releases the lug 82 on the toggle link 70 just at the end of the tack-driving operation, thus rendering the spring 76 effective to bend the toggle and thereby raise the arm 60 a little above the lower limit of its movement. The lower end of the driver 58 is thus retracted a short distance from the head of the tack, as illustrated in Fig. 4. It will be understood that at this time the arm 64 on which the toggle link 66 is mounted is held stationary against the bumper 120. The toggle is restored to its straightened condition by a stop screw 128 mounted in an arm fast on the upper end of the plate 18, this screw engaging a finger 130 on the toggle link 66 as the arms 60 and 64 are swung upwardly by the action of the pin 96 on the arm 94 to return the driver 58 to its starting position. It will be understood that when the toggle is thus straightened the latch 80 again assumes its operative relation to the lug 82 on the toggle link 70 to hold the toggle in straightened condition in the next driving operation.

While the invention is herein illustrated as applied to mechanism in the operation of which the fastening is driven only part way into the work, it is to be understood that it is not limited to mechanism which acts in that manner on the fastening.

Having described the invention, what I claim as new and desire to secure by Letters Patent of the United States is:

1. In fastening-inserting mechanism, the combination with a driver, of driver-operating mechanism comprising members movable in unison to operate the driver to drive a fastening, and automatic means for effecting relative movement of said members to impart to the driver a partial retractive movement at the end of its driving movement.

2. In fastening-inserting mechanism, the combination with a driver, of driver-operating mechanism comprising members movable in unison to operate the driver to drive a fastening, and spring-operated means arranged to be rendered operative by such movement of the members to effect a relative movement thereof and thus impart to the driver a partial retractive movement at the end of its driving movement.

3. In fastening-inserting mechanism, the combination with a driver, of driver-operating mechanism comprising members movable in unison to operate the driver to drive a fastening, automatic means for effecting relative movement of said members to impart to the driver a partial retractive movement at the end of its driving movement, and means for thereafter operating said members fully to retract the driver and for restoring them to their normal relation to each other.

4. In fastening-inserting mechanism, the combination with a driver, of driver-operating mechanism comprising members movable in unison to operate the driver to drive a fastening, a device connecting said members for operating one member by the movement of the other, a spring for operating said device to effect relative movement of the members and thereby to impart to the driver a partial retractive movement at the end of its driving movement, a latch for holding said device normally against movement under the influence of the spring, and means to cause said latch to release the device substantially at the end of the driver-operating movement of the members.

5. In fastening-inserting mechanism, the combination with a driver, of driver-operating mechanism comprising members movable in unison to operate the driver to drive a fastening, a toggle connecting said members for operating one member by the movement of the other, means for holding the parts of said toggle in substantially fixed relation to each other during the operation of the driver, and means for flexing the toggle to effect relative movement of the members and thereby partially retract the driver at the end of its driving movement.

6. In fastening-inserting mechanism, the combination with a driver, of driver-operating mechanism comprising members movable in unison to operate the driver to drive a fastening, a toggle connecting said members for operating one member by the movement of the other, a spring tending to flex said toggle, means for holding said toggle against movement under the influence of said spring as the driver is operated, and means for releasing the toggle to the action of the spring substantially at the end of the operative movement of the driver to cause it to effect relative movement of said members and thereby impart to the driver a partial retractive movement.

7. In fastening-inserting mechanism, the combination with a driver, of driver-operating mechanism comprising members movable in unison to operate the driver to drive a fastening, a toggle connecting said members for operating one member by the movement of the other, a spring tending to flex said toggle, a device for holding the toggle against movement by said spring substantially throughout the operative movement of the driver, means for causing said device to release the toggle to the action of the spring substantially at the end of the driving movement of the driver to render the toggle effective to impart a partial retractive movement to the driver through relative movement of said members, means for operating said members fully to retract the driver, and mechanism arranged to act on the toggle as the members are thus operated to restore the toggle to its initial condition.

8. In fastening-inserting mechanism, the combination with a driver, of an arm mounted for swinging movement to operate the driver, a second arm mounted for swinging movement with said first-named arm, a toggle connecting said arms for operating the first arm by the second arm, means for limiting the movement of the second arm, and means for operating said toggle to move the first arm relatively to the second to impart a partial retractive movement to the driver when the second arm arrives substantially at the limit of its movement.

9. In fastening-inserting mechanism, the combination with a driver, of an arm mounted for swinging movement to operate the driver, a second arm mounted for swinging movement with said first-named arm, a toggle connecting said arms for operating the first arm by the second arm, means for limiting the movement of the second arm, a spring tending to flex said toggle, a device for holding the toggle against movement by the spring substantially throughout the operative movement of the second arm, and means for causing said device to release the toggle to the action of the spring substantially at the end of the movement of the second arm to cause the toggle to impart to the first arm a movement partially to retract the driver.

10. In fastening-inserting mechanism, the combination with a driver, of an arm mounted for swinging movement to operate the driver, a second arm mounted for swinging movement with said first-named arm, a toggle connecting said arms for operating the first arm by the second arm, means for limiting the movement of the second arm, a spring tending to flex said toggle, a latch for holding the toggle against movement by the spring, a stop for lifting said latch to release the toggle when the second arm arrives substantially at the limit of its movement to cause the toggle to impart to the first arm a movement partially to retract the driver, means for thereafter operating the second arm fully to retract the driver, and a stop for returning the toggle into position to be held by the latch as the driver is thus retracted.

11. In fastening-inserting mechanism movable toward and from a piece of work in directions transverse to the direction in which a fastening is driven thereby into the work, the combination with a spring-operated driver for driving the fastening, of means arranged to be operated to retract the driver to its starting position in response to the movement of the fastening-inserting mechanism away from the work, and additional means automatically operative to effect a partial retractive movement of the driver prior to the movement of said mechanism away from the work.

12. In fastening-inserting mechanism movable toward and from a piece of work in directions transverse to the direction in which a fastening is driven thereby into the work, the combination with a spring-operated driver for driving the fastening, of means arranged to be operated to retract the driver to its starting position in the course of the movement of the fastening-inserting mechanism away from the work, and spring means arranged to be rendered operative substantially at the end of the driving movement of the driver to effect automatically a partial retractive movement of the driver prior to the movement of said mechanism away from the work.

13. In fastening-inserting mechanism movable toward and from a piece of work in directions transverse to the direction in which a fastening is driven thereby into the work, the combination with a driver, of members movable in unison to operate the driver to drive the fastening, and automatic means for effecting relative movement of said members to impart to the driver a partial retractive movement prior to the movement of the fastening-inserting mechanism away from the work.

14. In fastening-inserting mechanism movable toward and from a piece of work in directions transverse to the direction in which a fastening is driven thereby into the work, the combination with a driver, of members movable in unison to operate the driver to drive the fastening, a device connecting said members for operating one member by movement of the other, and a spring arranged to operate said device to effect a partial retractive movement of the driver through relative movement of said members prior to the movement of the fastening-inserting mechanism away from the work.

ERIC A. HOLMGREN.